RECORDING DEVICES

Filed Sept. 12, 1960

INVENTOR.
JOSEPH F. BRUMBACH
BY
Wallace, Kinzer and Dorn
Att'ys.

United States Patent Office 3,055,977

Patented Sept. 25, 1962

3,055,977

RECORDING DEVICES

Joseph F. Brumbach, Niles, Ill., assignor, by mesne assignments, to Victor Comptometer Corporation, Chicago, Ill., a corporation of Illinois Filed Sept. 12, 1960, Ser. No. 55,293
6 Claims. (Cl. 178—19)

Figures 1, 2:
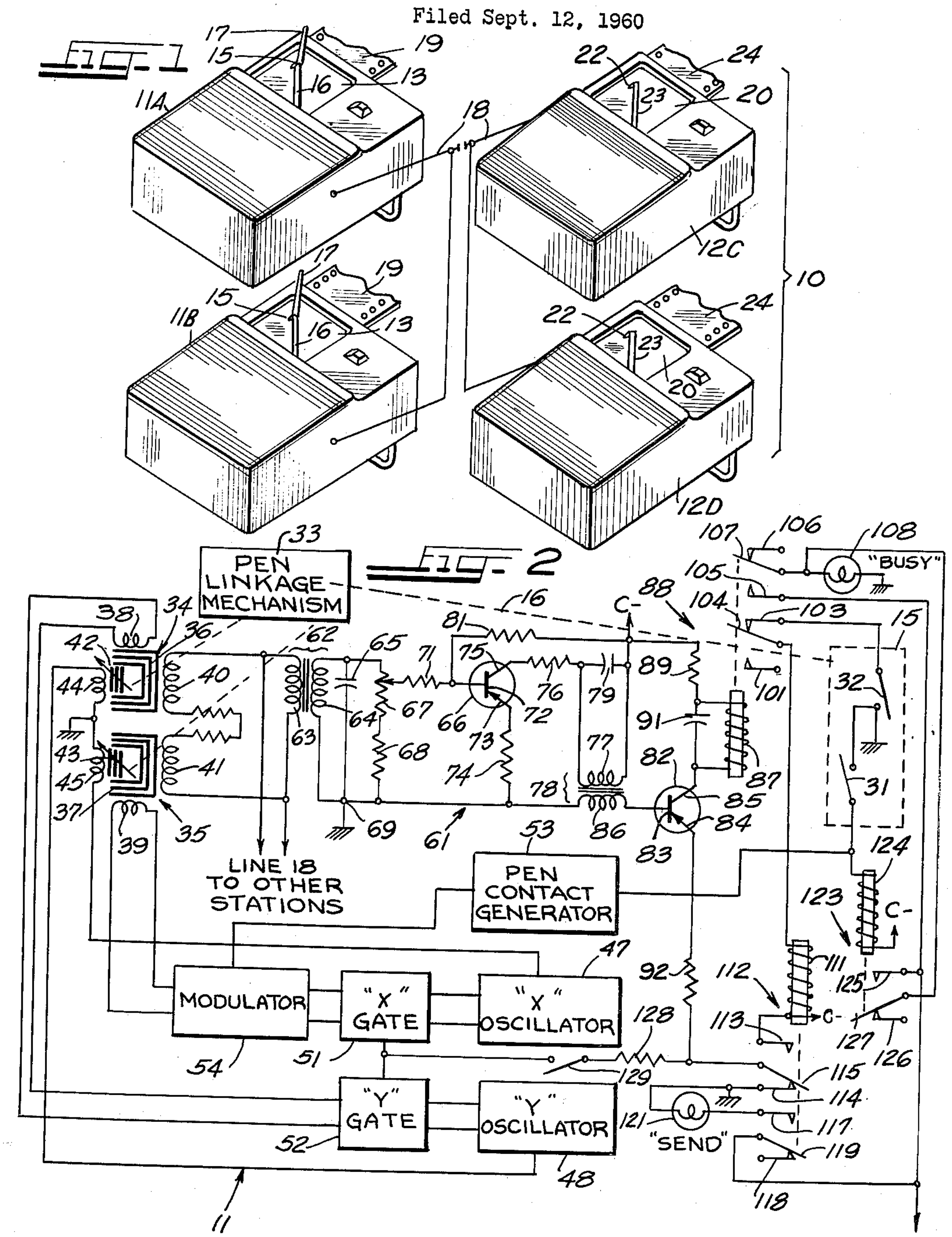

This invention relates to a new and improved transmitter for a graphic communication system and more particularly to a new and improved control circuit for a graphic communication transmitter which is effective to prevent operation of the transmitter if another transmitter is already operating on the line.

In a graphic communication system of the kind with which the present invention is concerned, a plurality of operating stations are provided for the transmission of written data, sketches, and the like, between separated locations. Typically, a system of this kind may include a plurality of transmitters each of which comprises a stylus or other writing instrument and means for analyzing movements of the stylus and for generating transmission signals representative thereof. In particular, coordinate position data with respect to the transmitter stylus may be transmitted as a modulated signal of given frequency; usually, two transmission signals are required and these may be at different frequencies. The modulation employed may be amplitude modulation but preferably is frequency modulation limited to a relatively restricted frequency range. The system also includes one or more receivers which utilize the transmitted signals to control recording of the data in essentially the same form as that in which it is transcribed at the transmitter.

Where more than one transmitter is incorporated in a graphic communication system of this kind, it is essential that operation of the system be limited to one transmitter insofar as the signals supplied to any given receiver may be concerned. Otherwise, if two transmitters operate simultaneously to control one receiver, the transcribed data at the receiver are quite unintelligible. On the other hand, it is not desirable to require more than a minimum of activity by a transmitter operator in initiating communication; that is, the operator should not be required to undertake any special procedure in order to find out if the transmission system is clear. This is particularly true where, as in many instances, the system may be operated by essentially unskilled or untrained personnel. Consequently, the communication system, and particularly the transmitter stations, should be equipped to restrict operation over any given portion of the transmission system to a single transmitter as an automatic function of system operation. The present invention is directed to a new and improved lock-out circuit for a graphic communication transmitter of this kind.

It is a primary object of the invention, therefore, to provide a new and improved control circuit for the transmitter of a graphic communication system, and particularly a system using frequency modulation, which is effective to keep the transmitter from starting a transmission operation whenever another transmitter of the system is already functioning.

Another object of the invention is to provide a new and improved lock-out control system for a graphic communication transmitter, incorporated in a system with at least one other transmitter, which clears the line automatically and immediately upon completion of a given transmission operation without requiring any special switching action or other action on a part of the transmitter operator.

Another object of the invention is to perform a lock-out function, in the transmitter of a graphic communication system, without locking the transmitter out in response to its own signals.

A further object of the invention is to afford a positive indication of the condition of a graphic communication system, with respect to whether the system is clear for operation of a given transmitter, and further to provide a positive indication of effective operation of the transmitter itself, using essentially the same indicating means.

A specific object of the invention is to provide a simple and economical control circuit arrangement which is effective to perform all of the functions set forth hereinabove at a minimum cost.

Thus, the invention relates to a transmitter station for a graphic communication system in which coordinate position data are transmitted as a modulated transmission signal. In the preferred form described hereinafter, frequency modulation is employed, and two transmission signals are utilized, but only one transmission signal is required for effective operation of the invention. The transmitter station comprises signal generator means for generating the necessary modulated transmission signal and signal transmission means for coupling the transmitter station to one or more other stations in the system. This signal transmission means includes the output circuit for the signal generator means. A lock-out amplifier is coupled to the signal transmission means; this amplifier may include at least one stage which is limited in response to signals corresponding substantially to the center frequency of the modulated transmission signal. First control means are coupled to the lock-out amplifier and to the signal generator and are employed to prevent operation of the transmitter signal generator when the amplifier is excited with a signal having a frequency essentially the same as that of the aforementioned modulated transmission signal. In addition, the transmitter station includes second control means, interlocked with the first control means, for preventing actuation of the first control means in response to transmission signals developed by the signal generator of the transmitter itself.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a perspective view of a graphic communication system in which the present invention may be utilized; and FIG. 2 is a detail schematic diagram of a lock-out control circuit constructed in accordance with the present invention, including a simplified illustration of other related parts of a transmitter station.

The communication system 10 illustrated in FIG. 1 comprises a pair of transmitting stations 11A and 11B and a pair of receiving stations 12C and 12D. Such stations could comprise transceiver units; for the purposes of the present invention, however, each of the stations is assumed to be either a transmitter or a receiver. Each of the transmitters 11A and 11B includes a writing surface 13. A recording pen or stylus 15 is included in each of the transmitters; in each instance, the pen is mounted upon a support arm or link 16 for movement into and out of engagement with the associated writing surface 13. Each pen 15 is also movable in a direction normal to the writing surface and is provided with a stylus actuator or control member 17. The actuator 17 may be a separate member linked to the pen 15, or may comprise an integral unit with the pen. Thus, at each of the transmitters 11A and 11B manual control of the transmitter pen 15, using the actuator 17, permits the transcription of a message upon a recording medium such as a paper web 19 supported upon the associated writing surface 13. The message may comprise words, sketches, or any other data capable of reproduction by the pen 15. The support arm 16 in each of the transmitters constitutes a part of a pen linkage mechanism which controls the operation of electrical translation and transmission circuits within the transmitter station. These transmitter circuits are employed to develop modulated transmission signals which may be transmitted to the receiver stations 12C and 12D by transmission means, such as by a conductive line 18 which interconnects all of the stations of the system 10. Other transmission means, such as a radio link, can be employed if desired.

Each of the receiver stations 12C and 12D includes a writing surface 20 which is essentially similar to the transmitter writing surface 13. At each receiver station, a receiver pen 22 is mounted upon a support arm or link 23 for movement into and out of contact with a paper web or other recording medium 24 that is supported on the writing surface 20. Movements of the receiver pens 22 are controlled by the modulated transmission signals from the transmitter units 11A and 11B, actuation of the receivers being restricted to one transmitter at any given time by the present invention, as described in detail hereafter. The structural details of the transmitter and receiver stations, and the particular form of the transmission signals, are not critical with respect to the present invention. Preferably, the basic communication apparatus may be similar to that described and claimed in United States Patent No. 2,583,535 to Robert Adler, issued January 29, 1952, and in United States Patent No. 2,649,503 to Robert Adler, issued August 18, 1953. Accordingly, reference may be had to these patents and to other previously known graphic recording systems to determine the general construction and operation of the system of FIG. 1.

FIG. 2 illustrates an operating circuit 11 which may be considered to correspond to either of the transmitter stations 11A and 11B of FIG. 1. The transmitter station circuit 11 includes the pen 15, which is illustrated in diagrammatic form and includes a contact-sensing switch 31 and an orientation sensing switch 32. The contact switch 31 affords a means for sensing engagement of the pen 15 with the recording medium on the recording surface 13 (FIG. 1). The switch 32, on the other hand, is a device which is sensitive to the inclination of the pen 15 from the horizontal, and it is employed as an automatic cut-off switch which need not be specifically actuated by the transmitter operator. A preferred form of pen construction, entailing both the switches 31 and 32, is described and claimed in the co-pending application of Peter Scheuzger, Serial No. 846,-606, filed October 15, 1959.

The transmitter pen 15 is mechanically connected to a pen linkage mechanism 33 by means of the support arm or link 16. A number of different operating mechanisms may be employed for the pen; preferably, however, the pen linkage mechanism 33 is of the kind described and claimed in the aforementioned patent to Robert Adler No. 2,583,535. The pen linkage mechanism 33, in turn, is mechanically connected to a pair of position transformers 34 and 35 of the kind described in the aforementioned Patent No. 2,649,503 to Robert Adler. The position transformer 34 includes a fixed core 36 having an input winding 38 and an output winding 40. This particular transformer also includes a movable core 42 which is rotatably movable relative to the main core 36 and which carries a winding 44. It is the rotatable core 42 which is mechanically linked to the pen mechanism 33.

Similarly, the position transformer 35 comprises a main core 37 having a pair of windings 39 and 41 thereon. The movable core for this position transformer is indicated by the reference numeral 43 and carries a winding 45. Again, it is the movable core which is connected to the pen linkage mechanism 33. The two output windings 40 and 41 of the position transformers are connected to each other and to the transmission line 18 to afford a means for transmitting signals to the other stations of the communication system 10 (FIG. 1) as described more fully hereinafter.

The signal generation system of the transmitter circuit 11 includes a pair of oscillators 47 and 48 which are associated with the position transformers 35 and 34 respectively. Thus, the oscillator 47, sometimes referred to herein as the "X" or horizontal oscillator, is coupled to the position transformer 35, and specifically the winding 39 of the transformer, through a gate circuit 51. In addition, the winding 43 on the movable core 45 of the position transformer 35 is coupled back to the oscillator 47. In a similar circuit arrangement, the "Y" oscillator or vertical oscillator 48 is connected through a gate circuit 52 to the winding 38 of the position transformer 34. The oscillator 48 is also coupled to the movable winding 44 of this position transformer. A pen contact signal generator 53 is included in the transmitter station circuit 11. The signal generator 53, which is connected to the pen contact sensing switch 31, is coupled to a modulator circuit 54 that is included in the "X" control circuit of the transmitter.

In operation, two coordinate position transmission signals are developed by the signal generator means comprising the oscillators 47 and 48, the position transformers 35 and 34, and the pen linkage mechanism 33. Because the operation of a system of this kind is described in detail in the aforementioned patent to Robert Adler No. 2,583,-535, only a brief description is deemed necessary herein. Thus, movement of the pen 15 in the "X" coordinate direction, the horizontal direction, causes a change in the rotational position of the movable core 43 relative to the main core 37 of the position transformer 35. This change in the position of the core 43 is effective to modulate the frequency of the output signal supplied to the output winding 41 of the transformer 35, the normal operating frequency being determined by the frequency selected for the oscillator 47. By the same token, movements of the pen 15 in the other or "Y" coordinate direction are converted, by the transmission transformer 34, into frequency variations in the signal developed in the output winding 40 of the position transformer 34. In one commercial system, which utilizes a frequency of 2200 cycles for the horizontal oscillator 47, the center frequency for the vertical signal, determined by the oscillator 48, is 1400 cycles. Opening and closing of the pen contact switch 31 causes an additional minor frequency modulation of the horizontal transmission signal, by controlling operation of the circuits 53 and 54. A preferred form of pen contact control circuit is described and claimed in the co-pending application of Robert Adler and Myron L. Anthony, Serial No. 38,995, filed June 27, 1960. Preferably, the frequency modulation of the two data transmission signals developed in the transformer output windings 40 and 41 is held to approximately ten percent or less of the center frequencies.

The transmitter station circuit 11 includes a lock-out amplifier 61 coupled to the transmission line 18 or other signal transmission means that couples the transmitter to the other stations of the system. The lock-out amplifier 61 includes an input transformer 62 having a primary winding 63 connected in series with one side of the transmission line 18. The secondary winding 64 of the input transformer is preferably tuned to a predetermined frequency by means of a capacitor 65. Thus, the resonant input circuit 64—65 of the lock-out amplifier 61 may be tuned to the center frequency of the horizontal oscillator 47, in this instance 2200 cycles. The input circuit of the lock-out amplifier could also be made resonant at the normal operating frequency of the vertical oscillator 48. The amplifier can also be left untuned, particularly where the data signals are the highest amplitude signals on the line.

The secondary winding 64 of the input transformer 62 is connected to the input circuit of a first transistor 66 comprising the first stage of the lock-out amplifier 61. The coupling circuit comprises a potentiometer 67 and a resistor 68 connected in series with each other across the winding 64, one terminal 69 of the winding 64 being connected to a plane of reference potential here indicated as ground. The coupling circuit further includes a series resistor 71 connected between the movable tap on the potentiometer 67 and the base electrode 72 of the transistor 66. The coupling circuit comprising the impedances 67, 68 and 71 are utilized to adjust the amplitude level of the signal applied to the transistor 66; this adjustment is not always essential and, if desired, the secondary winding 64 of the input transformer 62 may be connected directly to the electrode 72, eliminating the adjustable coupling circuit.

The emitter electrode 73 of the transistor 66 is returned to ground through a resistor 74. The collector or output electrode 75 is connected to a suitable source of operating potential, herein designated as C—, through a load circuit comprising, in series, a resistor 76 and the primary winding 77 of a coupling transformer 78. The transformer 78 is a part of a tuned coupling stage, the winding 77 forming a resonant circuit with a capacitor 79; the resonance frequency is the same as the resonance frequency of the input circuit 64—65 of the lock-out amplifier. A bias resistor 81 is connected from the C— supply to the base electrode 72 of the transistor 66.

A second stage of the lock-out amplifier 61 comprises a transistor 82 having a base electrode 83, an emitter electrode 84, and a collector electrode 85. The input circuit to the second stage transistor 82 comprises the secondary winding 86 of the tuned-primary coupling transformer 78, this winding being connected between the base electrode 83 of the transistor and ground. The collector electrode 85 is connected to the C— supply through an output circuit comprising, in series, the operating coil 87 of a first control relay 88. In the illustrated circuit, the operating circuit of the coil 87 includes a time delay circuit comprising a resistor 89 that is connected in series with the coil 87 and a capacitor 91 connected in parallel with the coil. The emitter 84 of the second stage transistor, on the other hand, is returned to ground through a circuit including a series resistor 92.

The relay 88 includes a first pair of fixed contacts 101 and 103 engageable by a moving contact 104. The relay further includes a second pair of fixed contacts 105 and 106 engageable by a moving contact member 107. The relay is shown in its normal or unenergized condition, in which the movable contacts 104 and 107 engage the fixed contacts 103 and 106 respectively. Upon actuation of the relay, the contacts 104 and 107 move into engagement with contacts 101 and 105, respectively, in the usual manner.

The two outer relay contacts 101 and 106 are left open-circuited. The movable contact 107 is connected in series with an indicator light 108, the indicator light being returned to a plane of reference potential here indicated as ground. The fixed contact 105, on the other hand, is connected to a suitable power supply for the indicator light; a typical power source in this instance may be a 6-volt A.C. supply, depending upon the indicator light selected for the element 108. The fixed contact 103 is connected to the switch 32 in the pen 15, the other terminal of the switch being returned to ground.

The remaining contact of the relay 88, the movable contact 104, is connected in series with the operating coil 111 of a second control relay 112, the other terminal of the winding 111 being connected to the C— supply. The relay 112 may be essentially similar to the relay 88 and may include a first pair of fixed contacts 113 and 114 engageable by a movable contact 115 and a second pair of fixed contacts 117 and 118 engageable by a movable contact 119.

The first fixed contact 113 of the relay 112 is connected to the C— power supply. The associated movable contact 115, which normally engages the fixed contact 114, is connected in series with the resistor 92 in the emitter circuit of the second stage transistor 83 of the lock-out amplifier. The fixed contact 114 is returned to ground. The first fixed contact 117 in the second pair is connected to an indicator light 121, the indicator light being returned to ground. The movable contact 119 is connected to the 6-volt A.C. supply, whereas the other fixed contact 118 of the relay 112 is left open-circuited.

The control circuit of FIG. 2 also includes an indicator relay 123. The operating coil 124 of the relay 123 is connected, at one terminal to a suitable power supply such as the C— operating supply. The other terminal of the relay coil is returned to ground through the pen contact switch 31. The indicator relay 123 includes, in this instance, only a single pair of fixed contacts 125 and 126 which may be engaged alternately by a movable contact 127. The contact 126 is left open-circuited, whereas the other fixed contact 125 is connected to the indicator light power supply. The movable contact 127 is connected to the movable contact 107 of the relay 88, and hence to the indicator light 108.

In addition to the connections described hereinabove, the movable contact 115 of the second control relay 112 is connected to the two gate circuits 51 and 52. The connecting circuit may include a suitable series resistor 128, and also includes, in series, an on-off switch 129. The manual control switch 129 is preferably ganged with the main power supply switch of the transmitter (not shown).

In considering operation of the transmitter circuit 11, with respect to the lock-out control portions of the circuit, it should be understood that the two gate circuits 51 and 52 are effective to block the transmission of carrier signals from the oscillators 47 and 48 to the position transformers 35 and 34 except when the gate circuits are connected to a suitable source of operating potential such as the negative power supply C—. That is, the gate circuits are normally non-conductive but may be rendered conductive by connection to the C— supply. To energize the transmitter, the manual control switch 129 must be closed. This does not, by itself, complete a circuit between the C— supply and the gate circuits 51 and 52, because the operating circuit for the two gates is open at the contacts 113 and 115 of the second control relay 112. With the switch 129 closed, however, the gate circuits may be energized by energization of the relay 112, which is effective to close the contacts 113 and 115. To actuate the relay 112, it is only necessary for the transmitter operator to pick up the pen 15, thereby automatically closing the cut-off switch 32 in the pen. When this is done, an operating circuit is completed from the C— supply through the coil 111 of the relay 112, the contacts 103 and 104 of the relay 88, and the switch 32, to ground. Accordingly, the contacts 113 and 115 are closed, conditioning the gate circuits 51 and 52 for transmission of signals from the oscillators to the transmission transformers. In addition, the contacts 117 and 119 of the relay 112 close, establishing an energizing circuit for the lamp 121. The lamp 121, designated in the drawing as the "Send" lamp, affords a positive indication that the transmitter is conditioned for transmission of a message or other data to the receivers of the system.

Thus, in normal use, the switch 129 is closed. As long as the pen 15 (or associated actuator 17) is held in generally upright position by the transmitter operator, the transmitter is conditioned for a sending operation and "Send" light 121 remains lit. Each time that the pen is brought into contact with the recording medium, the contact switch 31 is closed. Closing of the switch 31 energizes the operating coil 124 of the relay 123 through a circuit comprising, in series, the C— supply, the coil 124, the pen contact switch 31, and ground. Actuation of the relay 123 closes the contacts 125 and 127, affording an energizing circuit for the "Busy" signal light 108 from the 6-volt A.C. supply to ground. Consequently, the "Busy" light 108 is energized each time the pen 15 contacts the recording medium, giving a positive indication of operation of the pen. The closing of the switch 31 also controls operation of the pen contact signal generator 53 as described in the aforementioned application of Robert Adler and Myron L. Anthony, Serial No. 38,995, filed June 27, 1960.

Ordinarily, during any period in which it is expected that the transmitter might be utilized, the switch 129 is closed and is left closed. This is particularly true where the transmitter 11 is part of a transmitting and receiving station that includes a receiver coupled to the transmission line 18 in addition to the transmitter 11. Under such circumstances, and with the automatic cut-off switch 32 in the pen remaining in its open condition, an incoming signal may appear on the transmission line 18 from another transmitter in the system. This incoming signal includes a 2200-cycle component representative of the horizontal coordinate control signal developed by the other transmitter and transmitted to the receivers of the system. This received signal excites the tuned input circuit 64—65 of the lock-out amplifier 61. The received signal is amplified in the two stages of the amplifier 61, comprising the transistors 66 and 82, and is applied to the operating coil 87 of the lock-out relay 88. Consequently, the relay is energized, closing the contacts combinations 101, 104 and 105, 107.

Actuation of the first control relay 88 precludes effective energization of the second control relay 112 because the operating coil 111 of the second control relay is now open-circuited at the contact 104 of the first control relay. Accordingly, closing of the switch 32 can no longer complete an operating circuit for the second control relay. Because the second control relay 112 cannot be actuated, the operating circuit connecting the gates 51 and 52 to the power supply C— can no longer be completed and the transmitter 11 cannot be conditioned for a transmission operation. The fact that the transmission system is busy with a signal from another transmitter is positively indicated by energizing the "Busy" lamp 108 through the operating circuit afforded by the contacts 105 and 107 of the relay 88. Moreover, it is obvious to the transmitter operator that the lamp 108 is not energized by the transmitter 11 itself, since the lamp remains lit continuously without the pen contacting the recording medium to close the switch 31.

To be effective, it is necessary that the lock-out control circuit of the transmitter 11 distinguish between incoming signals from other transmitters and the transmission signals generated by the transmitter 11 itself. This is accomplished by the interlocking circuits between the relays 88 and 112 and the lock-out amplifier 61. Thus, when the transmitter 11 is engaged in a transmission operation, the relay 112 is energized as described hereinabove. Under these circumstances, the closing of the contacts 113 and 115 opens the normal ground-return circuit for the emitter 84 of the second stage transistor 82 in the lock-out amplifier. Instead, the emitter 84 is connected to the C— supply and thus is held at approximately the same potential as the collector of the transistor. Accordingly, the transistor 82 is effectively cut off and cannot energize the first control relay 88. Thus, as long as the tranmitter 11 is actually in use, it cannot be locked out by its own transmission signal. On the other hand, as soon as the operator puts the pen 15 down, and the switch 32 opens, the relay 112 is de-energized as described hereinabove. When this happens, and another transmitter comes on the line, the lock-out system is immediately actuated to block operation of the transmitter 11 until such time as transmission by the other transmitter is completed.

From the foregoing description, it may be seen that the lock-out amplifier 61 and the associated control circuits keep the transmitter 11 off the line when another transmitter is already sending. The control circuit of the invention automatically clears the line whenever the operator puts the pen 15 down, through the use of the switch 32 and the two relays 88 and 112. The interlocking connection to the amplifier 61, in the emitter of the second stage, prevents lock-out on the signals generated by the transmitter itself. The "Busy" and "Send" lamps afford a positive indication of whether the system is in use or is cleared for transmission; the "Busy" lamp also provides a convenient check on operation of the transmitter pen contact switch.

Hence, while preferred embodiments of the invention have been described and illustrated, it is to be understood that they are capable of variation and modification.

I claim:

1. A transmitter station for use with other transmission stations in a graphic communication system in which coordinate positioning data are transmitted as a modulated transmission signal comprising: signal generator means for generating said modulated transmission signal; signal transmission means, comprising an output circuit for said signal generator means and serving to couple the transmitter station to one or more other transmitter stations in the system; a lock-out amplifier, coupled to said transmission means, including means operatively responsive to said transmission signals; first control means, coupled to said lock-out amplifier and to said signal generator means, for effectively preventing operation of said signal generator means while a transmission signal is being supplied to the amplifier from one of the other stations coupled to said transmission means; and second control means, interlocked with said first control means, for preventing actuation of the first control means in response to a transmission signal developed by said signal generator means.

2. A transmitter station for use with other transmitter stations in a graphic communication system in which coordinate position data defining the position of a manually operable pen are transmitted as a modulated transmission signal, comprising; a manually operable pen; signal generator means, coupled to said pen, for generating said modulated transmission signal; signal transmissions means, comprising an output circuit for said signal generator means and serving to couple the transmitter station to one or more other transmitter stations in the system; a lock-out amplifier, coupled to said transmission means and including means responsive to transmission signals; first control means for effectively preventing operation of said signal generator means while a signal is being supplied to the amplifier from another of said stations coupled to said transmission means, said first control means being coupled to said lock-out amplifier for actuation thereby, and further being coupled in circuit with said signal generator means; and second control means for preventing actuation of the first control means in response to a transmission signal developed by said signal generator means, said second control means including an automatic control switch incorporated in and actuated by changes in orientation of said pen, for interlocking said first and second control means.

3. A transmitter station for use with other transmitter stations in a graphic communication system in which coordinate position data and pen contact data are each transmitted as a modulated transmission signal, comprising: a manually operable pen movable across a recording surface and engageable and disengageable therewith; first signal generator means, coupled to said pen, for generating a transmission signal modulated in accordance with pen position data; second signal generator means for developing a pen-contact control signal; signal transmission means, coupled to both said signal generator means, for coupling the transmitter station to one or more other transmitter stations in the system; a lock-out amplifier, coupled to said transmission means, including at least one stage effectively operatively responsive only to said transmission signals; first control means, coupled to said lock-out amplifier and to said first signal generator means, for effectively preventing operation of said first generator means while a transmission signal is being supplied to the amplifier from one of said other stations coupled to said transmission means; second control means, interlocked with said first control means, for preventing actuation of the first control means in response to transmission signals developed by said signal generator means and indicator means, coupled to said second signal generator means and to said first control means, for positively indicating both the development of said pen-contact control signal and the lock-out of said first signal generator means.

4. A transmitter station for use with other transmitter stations in a graphic communication system in which coordinate position data are transmitted as a modulated transmission signal, comprising: signal generator means, for generating said modulated transmission signal; signal transmission means, comprising an output circuit for said signal generator means and serving to couple the transmitter station to one or more other transmitter stations in the system; a lock-out amplifier, coupled to said transmission means, including at least one stage effectively operatively responsive only to said modulator signals; and lock-out control means for preventing operation of the signal generator means while a modulated signal is being supplied to the amplifier from one of said other stations coupled to said transmission means but without locking out the signal generator means in response to its own transmission signal, said control means comprising a first control relay coupled to said lock-out amplifier for actuation by an output signal from said amplifier, a second control relay including contacts coupled to said signal generator means and to said lock-out amplifier to energize said signal generator means and lock-out amplifier alternately with each other, and means, intercoupling said relays, for actuating said second control relay to block said lock-out amplifier whenever said signal generator means is placed in operation and to block said signal generator means whenever said first control relay and said lock-out amplifier are actuated by a signal from other transmitter stations in the system.

5. A transmitter station for use with other transmitter stations in a graphic communication system in which coordinate positioning data are transmitted from each of several said stations as a modulated transmission signal, comprising: a manually operable recording pen; a sensing switch responsive to movements of said pen between a recording orientation and a non-recording orientation relative to a recording medium; signal generator means, coupled to said pen, for generating said modulated transmission signal; signal transmission means, comprising an output circuit for said signal generator means, and serving to couple the transmitter station to one or more other transmitter stations in the system; a lock-out amplifier, coupled to said transmission means, including at least one stage operatively responsive only to said modulated transmission signals; and lock-out control means for preventing operation of the signal generator means when a transmission signal is supplied to the amplifier from one of said other stations coupled to said transmission means but without locking out the signal generator means in response to its own transmission signal, said control means comprising a first control relay coupled to said lock-out amplifier for actuation by an output signal from said amplifier, a second control relay including contacts coupled to said signal generator means and to said lock-out amplifier to energize said signal generator means and lock-out amplifier alternately with each other, and means intercoupling said relays, for energizing said second control relay to block said amplifier, upon movement of said pen to recording orientation, said intercoupling means including a set of contacts of said first control relay connected in series with said sensing switch in series with said second control relay, said contacts being open when said first relay is energized and closed when said first relay is deenergized.

6. A transmitter station for use with other transmitter stations in a graphic communication system in which coordinate position data are transmitted as a pair of modulated transmission signals of given different frequency, comprising: a manually operable recording pen including a recording orientation sensing switch and a recording contact sensing switch; signal generator means, mechanically coupled to said pen, for generating said modulated transmission signals; signal transmission means, comprising an output circuit for said signal generator means and means coupling the transmitter station to one or more other transmitter stations in the system; a lock-out amplifier, coupled to said transmission means, including at least one stage having a relatively narrow band-pass characteristic and operatively responsive only to signals at one of said given frequencies; and lock-out control means for preventing operation of the signal generator means while a signal of said given frequency is being supplied to the amplifier from other stations coupled to said transmission means yet being ineffective to lock out the signal generator means in response to transmission signals developed thereby, said control means comprising a first control relay coupled to said lock-out amplifier for actuation between a sending condition and a lock-out condition by an output signal from said amplifier; a second control relay including contacts coupled to said signal generator means and to said lock-out amplifier to energize said signal generator means and lock-out amplifier alternately with each other; control circuit means, intercoupling said relays, for energizing said second control relay to block said lock-out amplifier when said first relay is in its sending condition and to block said signal generator means when said first relay is in its lock-out condition, said control circuit means further including a connection to said orientation sensing switch to prevent blocking of said lock-out amplifier except when the transmitter station is actually in use; and individual indicator devices coupled to said orientation and contact sensing switches, respectively, to indicate positively when said transmitter station is in sending condition and when the transmission means is busy with signals from one of said other transmitter stations.

No references cited.